United States Patent [19]

Taniguchi et al.

[11] Patent Number: 5,028,373
[45] Date of Patent: Jul. 2, 1991

[54] METHOD FOR CONTROLLING INJECTION UNIT OF INJECTION MOLDING MACHINE

[75] Inventors: Yoshiya Taniguchi, Kako; Akio Yamada, Akashi, both of Japan

[73] Assignee: Toyo Machinery & Metal Co., Ltd., Hyogo, Japan

[21] Appl. No.: 466,851

[22] Filed: Jan. 18, 1990

[51] Int. Cl.⁵ .............................................. B29C 45/50
[52] U.S. Cl. .......................... 264/328.1; 264/328.17; 264/349; 425/207; 425/587; 366/78
[58] Field of Search .......... 264/328.1, 328.17, 328.18, 264/349; 425/207, 208, 209, 587, 582, 583; 366/78, 79

[56] References Cited

U.S. PATENT DOCUMENTS 4,042,660 8/1977 Bishop ............................. 264/328.12
4,592,712 6/1986 Gutjahr .............................. 425/145
4,879,077 11/1989 Shimizu et al. ..................... 264/40.1

Primary Examiner—Jill L. Heitbrink
Attorney, Agent, or Firm—Wegner, Cantor, Mueller & Player

[57] ABSTRACT

In an injection unit of an in-line screw type injection molding machine, a screw is provided rotatably in both normal and reverse directions within a heating cylinder. The screw is periodically reversed in a charging stroke with the period of normal rotation being longer than that of reverse rotation, whereby a resin material is kneaded and plasticized. As a result, the resin in a melting and pooling zone (flow zone) between the inner wall of the heating cylinder and the outer peripheral wall of the screw is effectively moved back and forth and hence plasticized and molten into a uniform molten resin.

7 Claims, 3 Drawing Sheets 5,028,373

METHOD FOR CONTROLLING INJECTION UNIT OF INJECTION MOLDING MACHINE

BACKGROUND OF THE INVENTION a) Field of the Invention

The present invention relates to a method for controlling an injection unit of an injection molding machine so as to knead and plasticize a resin material into a uniform molten resin ready for injection into an associated mold.

b) Description of the Related Art

In an in-line screw type injection unit, as is known well in the art, rotation of a screw in one direction within a heating screw causes a resin material, which has been charged into the heating cylinder from a hopper, to advance along threads of the screw to a front end portion of the heating cylinder while being kneaded.

The resin material is heated, plasticized and molten by heat conducted from the heating cylinder which is heated by a band heater and also by frictional heat developed within the resin material and between the resin material and associated metal surfaces owing to the kneading action of the screw.

As long as plasticization of a resin material is preformed depending solely on the above-described resin plasticization mechanism which relies upon external heating and simple unidirectional rotation of a screw, it is difficult to uniformly plasticize all kinds of resin materials, which vary widely, no matter how conditions for plasticization such as screw revolution speed, external heating temperature and back pressure are modified. To meet various requirements inherent to such resin materials, there has heretofore been no choice other than achieving the uniform plasticization by changing the screw design, for example, L/D (effective screw length/screw diameter), P/D (pitch between screw threads/screw diameter), the proportions of feed zone, compression zone and metering zone of a screw, the depth of threads in each zone of the screw, etc.

However, to retain many screws of different designs as described above for an injection unit of an injection molding machine of the above-described sort, which is desired to achieve kneading and plasticization of a wide range of resin materials by commonly using a single screw, is not advantageous from the standpoints of economy, cumbersome replacement and the like. Moreover, there is a limitation to the achievement of more uniform plasticization as long as modifications in the screw design are exclusively relied upon.

SUMMARY OF THE INVENTION

An object of the present invention is to provide an injection unit for an injection molding machine, which can uniformly plasticize a relatively wide variety of resin materials with a single kind of screw without the need for screw design modifications.

DESCRIPTION OF THE PREFERRED EMBODIMENTS

Figure 1:
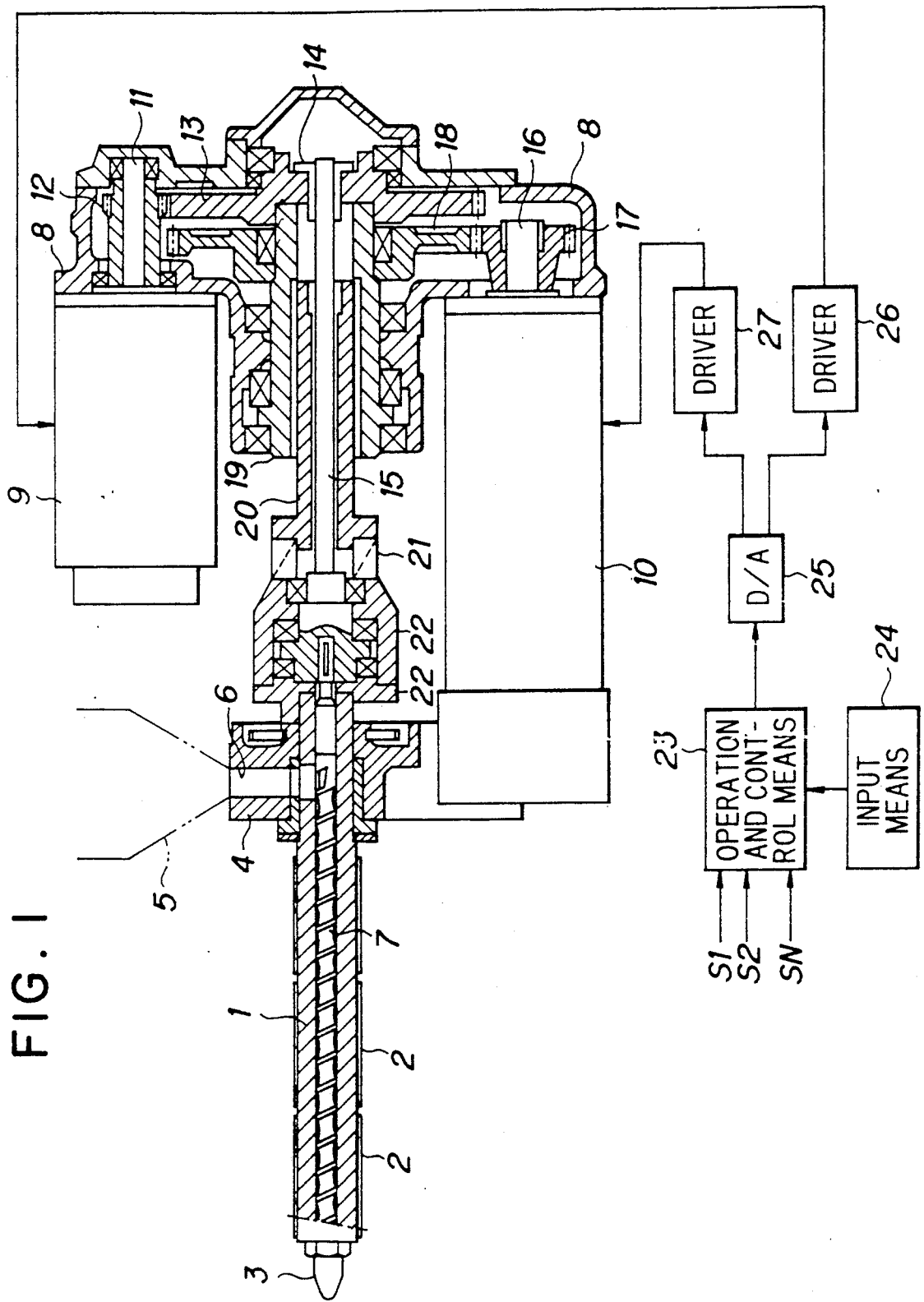
FIG. 1 schematically illustrates an injection unit of an injection molding machine and a control circuit system, which are suitable for use in the practice of a control method according to a first embodiment of the invention.

A control method according to a first embodiment of the present invention will now be described with reference to FIG. 1. Designated at numeral 1 is a heating cylinder which has a band heater 2 wrapped on an outer peripheral wall thereof and a nozzle 3 attached to a front end portion thereof. Numeral 4 indicates a support member which holds a rear end portion of the heating cylinder 1. The support member 4 is in turn supported on an unillustrated base of the injection unit, and defines an opening 6 for guiding a resin material, which is to be charged from a hopper 5, into the heating cylinder 1. Numeral 7 indicates a screw provided for rotation and axial movement within the heating cylinder 1. As known in the art, the screw defines a feed zone, a compression zone and a metering zone in order from the right toward the left on the drawing.

There are also shown a support body 8 mounted on the unillustrated base of the injection unit, a first electric servomotor 9 (hereinafter called the "first motor 9") mounted on the support body 8 and adapted to charge a resin material, and a second electric servomotor 10 (hereinafter called the "second motor 10") also mounted on the support body 8 and adapted to inject a molten resin. Although not shown in the drawing, the motors 9 and 10 are each internally provided with a rotation-detecting encoder.

Rotation of the first motor 9 is transmitted via a gear 12 fixed on an output shaft 11 of the first motor 9 and a gear 13 meshed with the gear 12 to a spline boss 14 which rotates as an integral member with the latter gear 13. The rotation is transmitted further via a charge drive shaft 15 splined with the spline boss 14 to the screw 7 secured at a rear end portion to the charge drive shaft 15. Therefore, normal and reverse rotations of the first motor 9 cause the screw to rotate in normal and reverse directions, respectively.

On the other hand, rotation of the second motor 10 is transmitted via a gear 17 fixed on a output shaft 16 of the second motor 10 and a gear 18 meshed with the gear 17 to an internally-threaded cylindrical member 19 which rotates as an integral member with the latter gear 17. Rotation of the internally-threaded cylindrical member 19 is converted into linear movement of an injection drive shaft 20 threadedly coupled with the internally-threaded cylindrical member 19 and is transmitted further as linear movement to a coupling 21 connected with the injection drive shaft 20 and then to a drive unit 22 connected with the coupling 21. The charge drive shaft 15 is held by the drive unit 22 in such a way that the charge drive shaft 15 may undergo free rotation only. By reciprocation of the drive unit 22 in the horizontal direction as viewed in the drawing, the charge drive shaft 15 and screw 7 are caused to move linearly back and forth. Namely, the screw 7 is provided to reciprocate between an advanced injecting position shown in FIG. 1 and an unillustrated retreated position when the second motor 10 rotates. Further, the second motor 10 also controls the back pressure.

The coupling 21 is provided with a resin pressure sensor although it is omitted for simplification in the drawing.

Numeral 23 indicates an operation and control means constructed of a microcomputer. The operation and control means 23 is equipped with various I/O interfaces, a ROM containing a main control program, fixed data and the like stored therein, a RAM for reading and writing various flags and inputted data, a μCPU (micro central processor unit) adapted to govern the overall control, etc. As will be described subsequently, the operation and control means 23 drives the first motor 9 and the second motor 10 under control. Although not shown in the drawing, the operation and control means 23 performs transfer of data with external memory means as needed and causes a display to show results of an operation or computation if necessary.

Designated at numeral 24 is an input means such as a keyboard or switches, through which an operator can input presetting information—such as the name of a resin material, grade number, charge completing position, back pressure, the type of a screw used—in the operation and control means 23 before operation of the injection unit. Based on these presetting information and an operation table obtained in advance by a case study and stored in its own ROM or in an outer storage means, the operation and control means 23 computes the speeds of normal and reverse rotations of the screw 7, the ratio of the period of normal rotation to that of reverse rotation, the cycle of normal and reverse rotations, etc. Further, based on the results of the computation and detected information $S_1, S_2, \ldots S_N$ from a group of sensors in the injection unit (for example, the encoders of the first and second motors, the injection pressure sensor, the position detecting sensor for the screw 7, sensors provided on the side of an associated mold, etc.), the operation and control means 23 outputs control signals to drivers 26, 27 by way of a D/A converter 25, whereby the first motor 9 and second motor 10 are driven by the drivers 26 and 27, respectively.

Figure 3:
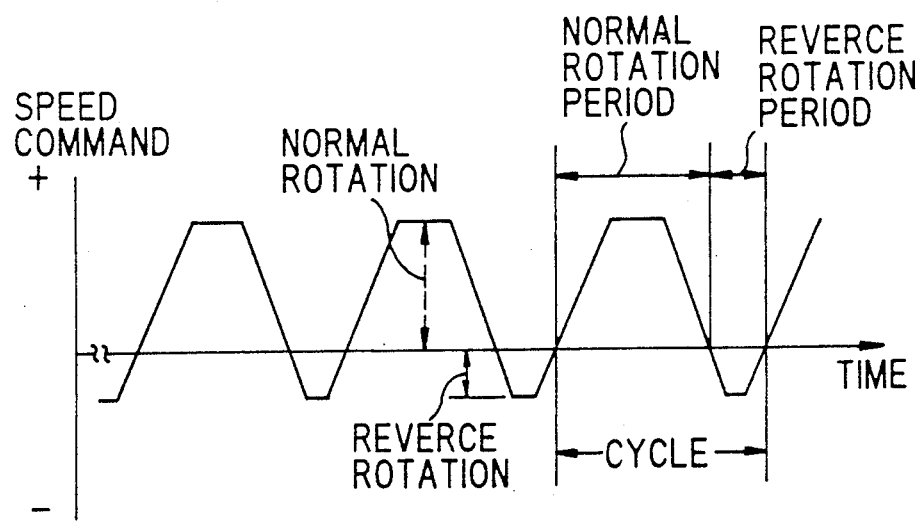
FIG. 3 is a time chart showing a cycle of normal rotation and reverse rotation of a drive motor for a screw.

In the construction described above, the screw 7 assumes the advanced position shown in FIG. 1 at the initiation of each one shot cycle during operation. In this state, the operation and control means 23 causes the first motor 9 to rotate in normal and reverse directions, for example, in accordance with a predetermined normal/reverse rotation cycle, a prescribed ratio of the period of normal rotation to that of reverse rotation and desired speeds of normal rotation and reverse rotation as shown in FIG. 3. As is apparent from FIG. 3, the period of normal rotation (i.e., rotation in a direction such as delivering a resin material to the front end portion of the screw 7) is longer than the period of reverse rotation and the speed of normal rotation is higher than that of reverse rotation. Accordingly, the action of conveyance by the normal rotation is dominant although the screw 7 is periodically and repeatedly reversed. As a result, the resin material supplied from the hopper 5 is delivered along the threads of the screw 7 to the front end portion of the screw 7 while being progressively kneaded and molten. At the same time, the operation and control means 23 drives the second motor 10 at a predetermined speed in the direction that the screw 7 is caused to retreat, whereby the screw 7 begins to retreat to an extent corresponding to the amount of the molten resin accumulated in the front end portion of the screw 7 by that time.

When the reaction force from the molten resin accumulated in the front end portion of the screw 7 reaches a predetermined level by initial rotation of the screw 7, the operation and control means 23 maintains normal and reverse rotation of the first motor 9 shown in the above-described FIG. 3 while having the second motor 3 control the retreating speed of the screw 7 to maintain constant the back pressure against the reaction force. As a result, the screw 7 is allowed to rotate under the condition of constant back pressure so that the molten resin is accumulated in the front end portion of the screw 7. When the thus-retreated position of the screw 7 has eventually reached a predetermined position, in other words, the molten resin accumulated in the front end portion of the screw 7 has increased to an amount sufficient for one shot, the normal and reverse rotation and the retreat of the screw 7 are stopped. Upon completion of the mold closure of the next step, the screw 7 is caused to advance at a high speed by means of the second motor 10 so that the molten resin accumulated in the front end portion of the screw 7 as described above is injected into an unillustrated mold.

During the above-described kneading and plasticizing step by the rotation of the screw 7, the screw 7 undergoes combined movement in which normal rotation and reverse rotation are periodically repeated. Since the resin material is kneaded and plasticized by periodically reversing the rotation of the screw, the (partly-molten) resin in the melting and pooling zone (flow zone) between the inner wall of the heating cylinder and the outer peripheral wall of the screw is effectively moved back and forth and is hence plasticized and molten into a highly uniform molten resin mass.

Figure 2:
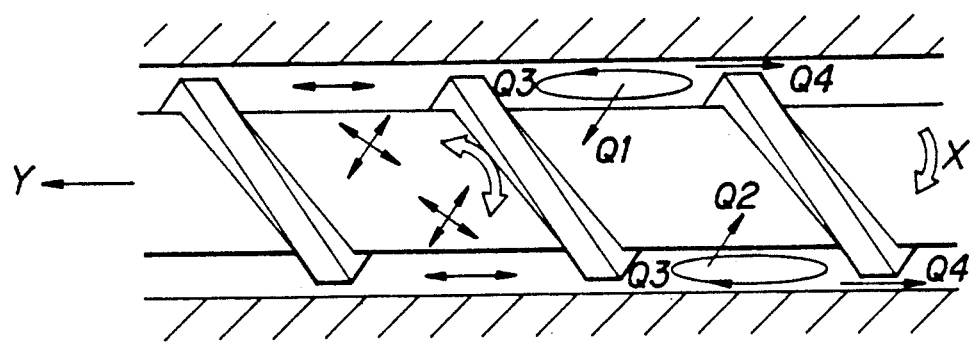
FIG. 2 is a simplified schematic illustration of the behavior of a resin in a flow zone.

It is difficult to conduct a detailed analysis on the behavior of the resin material in the flow zone. It is however said that when the screw is rotating in the direction indicated by arrow X in FIG. 2 (i.e., in the normal direction), there occur drag flows $Q_1$ and pressure back flows $Q_2$, the former advancing toward the nozzle as indicated by arrow Y based on the rotating and conveying action of the screw while the latter advancing in a direction away from the nozzle based on the difference between the pressure in the front portion of the screw and that in the rear portion of the screw, transverse flows $Q_3$ in a direction substantially parallel to the longitudinal axis of the screw owing to the combined action of the drag flows $Q_1$ and pressure back flows $Q_2$, and also leak flows $Q_4$. As a matter of fact, these four types of flows do not occur separately but do occur as combined complex flows to ensure uniform kneading and plasticization.

Since the screw is periodically reversed in the present invention, combined flows different from those produced during normal rotation are produced during reverse rotation of the screw. It has been confirmed that the molten resin can be kneaded more effectively into a more uniform molten resin mass by alternately repeating normal rotation and reverse rotation. Incidentally, the arrows shown in the left-hand region in FIG. 2 indicate, in a highly schematic manner, flows by normal rotation and reverse rotation. Therefore, these flows should not be interpreted as precisely reflecting the actual behavior of the resin material. It is to be noted that the resin material actually undergoes very complex behavior.

As described above with reference to FIG. 2, it has been confirmed that the resin material is kneaded more effectively and more uniformly and further, the resin material receives complex forces in various directions and produces heat by itself and coupled with the external heating by the heating cylinder, the resin material can be converted into a highly uniform molten plasticized state.

Figure 4:
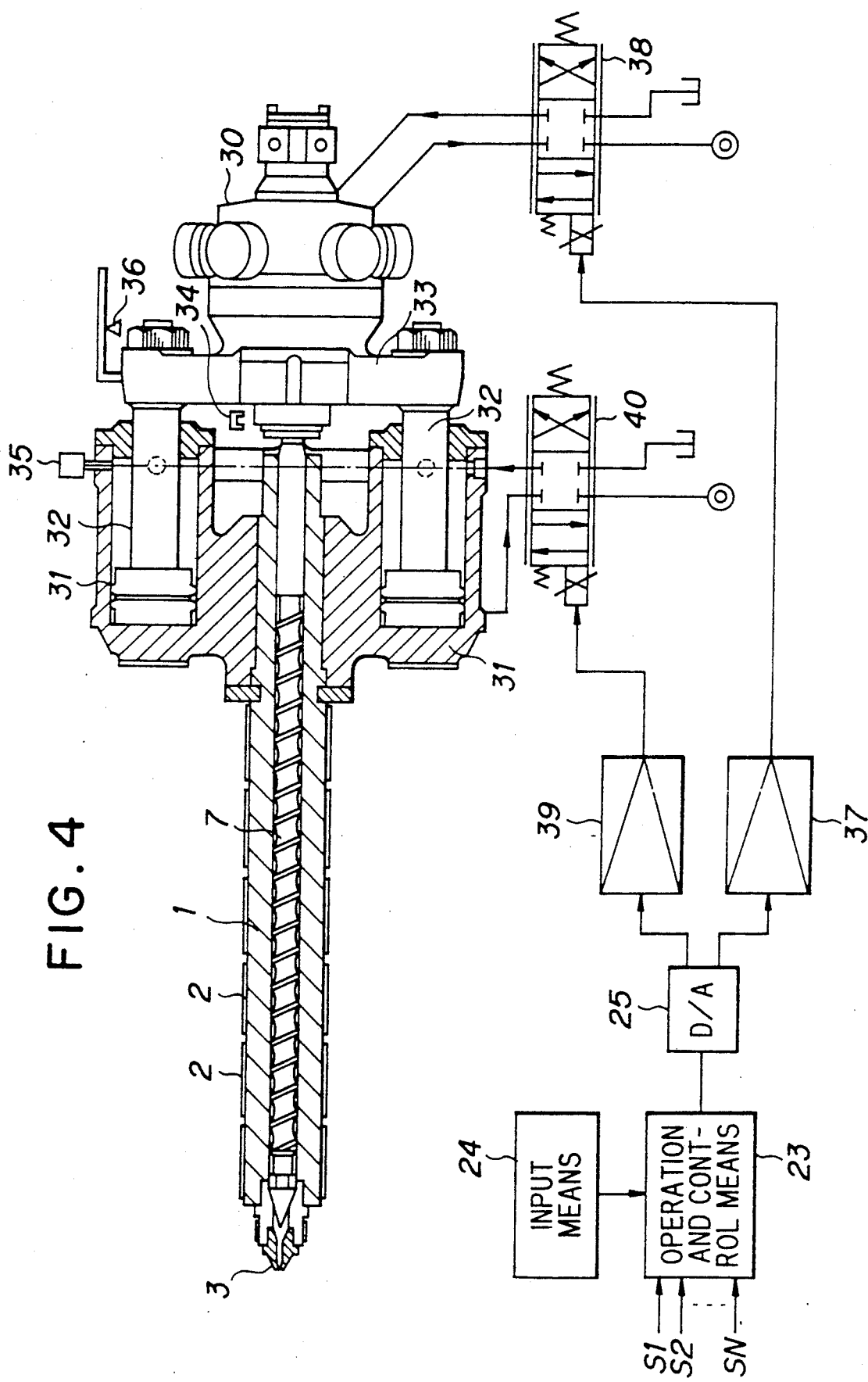
FIG. 4 is similar to FIG. 1 except that the injection unit and control circuit system are suitable for use in the practice of a control method according to a second embodiment of the invention.

A control method according to a second embodiment of the present invention will next be described with reference to FIG. 4, in which the normal and reverse rotation of the screw is effected by a hydraulic motor and the advancing and retreating movement of the screw is conducted by hydraulic cylinders. In FIG. 4, the members corresponding to those of FIG. 1 are designated by like reference numerals and their description is omitted herein in order to avoid unnecessary repetition.

In FIG. 4, there are depicted a hydraulic motor 30 whose output shaft is connected to the rear end of the screw 7 and a pair of hydraulic cylinders 31, 31 held on an unillustrated base of the injection unit. Connected to a piston rod 32 of each hydraulic cylinder 31 is a support 33 on which the hydraulic motor 30 is mounted, whereby the screw 7 is moved back and forth together with the hydraulic motor 30 when the piston rods 32, 32 advance and retreat in the horizontal direction as viewed in the drawing. Numerals 34, 35 and 36 indicate a motor rotation detection sensor, a cylinder pressure detection sensor and a screw position detection sensor, respectively.

The operation and control means 23, which is inputted with various presetting information and is also fed with various sensor information $S_1$-$S_N$ as described above, drives the hydraulic motor 30 under control via the D/A converter 25, a servo amplifier 37 and a servo valve 38 and also drives the hydraulic cylinders 31, 31 under control via the D/A converter 25, a servo amplifier 39 and a servo valve 40.

In the construction described above, the screw 7 assumes the advanced position shown in FIG. 4 at the initiation of each one shot cycle during operation. In this state, the operation and control means 23 causes via the servo valve 38 the hydraulic motor 30 to periodically rotate in normal and reverse directions in substantially the same normal/reverse rotation cycle, at substantially the same normal/reverse rotation period ratio and at substantially the same normal and reverse rotation speeds as in the above-described embodiment. As a result, the resin material supplied from the hopper is delivered along the threads of the screw 7 to the front end portion of the screw 7 while being progressively kneaded and molten, so that the screw 7 begins to retreat by the reaction force of the molten resin accumulated in the front end portion of the screw 7 by that time.

When the reaction force from the molten resin progressively accumulated in the front end portion of the screw 7 reaches a predetermined level, the operation and control means 23 controls the retreating speed of the screw 7 via the servo valve 40 to maintain constant the back pressure against the reaction force by means of the hydraulic cylinders 31, 31. In addition, the operation and control means 23 also maintains the above-described normal and reverse rotation of the hydraulic motor 30 via the servo valve 38. When the thus-retreated position of the screw 7 has eventually reached a predetermined position, in other words, the molten resin accumulated in the front end portion of the screw 7 has increased to an amount sufficient for one shot, the rotation of the screw 7 is stopped. Upon completion of the mold closure of the next step, the screw 7 is caused to advance at a high speed by means of the hydraulic cylinders 31, 31 so that the molten resin accumulated in the front end portion of the screw 7 is injected into an unillustrated mold.

Since the screw also repeatedly undergoes normal rotation and reverse rotation during the kneading and plasticizing step in the second embodiment, the second embodiment can bring about similar advantageous effects to the first embodiment described above.

As has been described above, the present invention has made it possible to uniformly plasticize a relatively wide range of resin materials in an injection unit of an injection molding machine by commonly using the same screw or screws. Its industrial value is therefore significant.

The present invention has been described by the embodiments shown in the drawings. Needless to say, it is to be understood that various changes, variations and modifications, for example, on the mechanism of the injection unit, the control method and the like, may be employed by those skilled in the art without departing from the scope or spirit of the present invention.

What is claimed is:

1. A method for controlling an injection unit of an injection molding machine for injection of a resin material into a mold, said injection unit comprising a screw rotatably and axially movable within a heating cylinder, said method comprising:
   (a) uniformly plasticizing the resin material by reciprocally rotating said screw along a longitudinal axis of the screw between a normal direction of rotation of the screw and a reverse direction of rotation of the screw as the screw is moved axially away from the mold; and
   (b) axially advancing the screw towards the mold and injecting molten resin into the mold.

2. The method of claim 1, wherein the period of normal rotation of the screw is set longer than that of reverse rotation of the screw.

3. The method of claim 2, wherein the speed of normal rotation of the screw is set higher than that of reverse rotation of the screw.

4. The method of claim 1, wherein the screw is driven in both normal and reverse directions by an electric servo motor.

5. The method of claim 1, wherein the screw is driven in both normal and reverse directions by a hydraulic motor which is controlled by a servo valve.

6. The method of claim 1, wherein the speed of normal rotation of the screw is set higher than that of reverse rotation of the screw.

7. The method of claim 1, wherein an overall rotation of the screw in the normal direction is greater than an overall rotation of the screw in the reverse direction during plasticization of the resin material in step (a).

* * * * *